United States Patent [19]

Tanaka

[11] Patent Number: 4,961,109
[45] Date of Patent: Oct. 2, 1990

[54] CHARGEABLE PROGRAM RECEIVING LIMIT SETTING SYSTEM IN TWO-WAY CABLE TELEVISION SYSTEM

[75] Inventor: Hideo Tanaka, Tokyo, Japan

[73] Assignee: Pioneer Electronic Corporation, Tokyo, Japan

[21] Appl. No.: 372,154

[22] Filed: Jun. 27, 1989

Related U.S. Application Data

[63] Continuation of Ser. No. 13,101, Feb. 10, 1987, abandoned.

[30] Foreign Application Priority Data

Feb. 10, 1986 [JP] Japan .................................. 61-27518

[51] Int. Cl.⁵ .......................... H04N 7/10; H04N 7/16
[52] U.S. Cl. ........................................ 358/84; 380/20; 455/2; 455/4; 358/86
[58] Field of Search ........................... 358/84, 86, 349; 380/20; 455/2, 4, 6

[56] References Cited

U.S. PATENT DOCUMENTS 3,185,537 5/1965 Court et al. .
4,145,717 3/1979 Gulf et al. ........................... 358/121
4,484,217 11/1984 Block et al. ............................. 358/84
4,528,589 7/1985 Block et al. ....................... 358/84 X
4,536,791 8/1985 Campbell et al. ................ 358/84 X
4,712,238 12/1987 Gilhousen et al. .................... 380/20
4,740,835 4/1988 Nishibori et al. ...................... 358/86

FOREIGN PATENT DOCUMENTS 128555 12/1984 European Pat. Off. .............. 358/84
86/01962 3/1986 World Int. Prop. O. ............ 358/84

Primary Examiner—Jin F. Ng
Assistant Examiner—Wing F. Chan
Attorney, Agent, or Firm—Sughrue, Mion, Zinn, Macpeak & Seas

[57] ABSTRACT

A CATV television system in which a subscriber can only charge a maximum number of events before the central facility polls the subscriber's terminal unit for charged events. The subscriber's terminal contains a credit limit register which contains the maximum number of chargeable events. The central facility can change the individual subscriber's credit limit register, dependent on credit worthiness, by a command sent over the CATV lines.

5 Claims, 3 Drawing Sheets

COMMAND FORMAT OF THE POLLING

CHARGEABLE PROGRAM RECEIVING LIMIT SETTING SYSTEM IN TWO-WAY CABLE TELEVISION SYSTEM

This is a continuation of application Ser. No. 07/013,101 filed Feb. 10, 1987 now abandoned.

BACKGROUND OF THE INVENTION

1. Field of the Invention

This invention relates to a two-way cable television system. More particularly, the invention relates to a chargeable-program-receiving limit setting system in a two-way cable television system.

2. Background of the Invention

In general, in a cable television system (hereinafter referred to as "a CATV system") there are non-chargeable (or free) programs and chargeable programs. For chargeable program, the charging information for chargeable programs received by each subscriber is stored in a register in the terminal unit of the subscriber, and is then read out by polling at the central facility in the CATV system.

A conventional two-way CATV system of this type is as shown in FIG. 5.

In FIG. 5 a central facility 1 transmits data and video signals from a video source 6 and receives "up" data. A CPU (central processing unit) 7 performs data communication, audience control and charging process. An FSK transmitter 8 transmits data to CATV lines. A modem 9 receives "up" data through telephone lines from subscribers.

Further in FIG. 5, a CATV terminal unit 2 is provided to each subscriber. An FSK receiver 10 demodulates data which are transmitted from the central facility 1 (hereinafter referred to as "a center"). An A controller 11 performs the audience control of the terminal unit 2 according to the operation made by the subscriber or according to "down" data or performs data communication with an "up" communication module 3. The CATV terminal unit 2 further includes a converter 12 and a descrambler 13 and is connected to a television set 4. A telephone line exchange network 5 links the central facility 1 to the CATV terminal unit 2.

The arrangement of the "up" communication module 3 is as shown in FIG. 6. A telephone modem 14 applies "up" data to telephone lines which are to be transmitted to the center 1 from the terminal unit 2 and a B controller 15 performs communications with the A controller 11, controlling an event register 16 (described later), and transmitting "up" data. The event register 16 is used to store a history of received chargeable programs (hereinafter referred to as a "chargeable program reception history").

A charging system in the two-way CATV system thus organized will be described.

The A controller reads a chargeable program identifying code (hereinafter referred to as "an event code") contained in a video signal transmitted through the descrambler 13, and communicates it to the B controller 15 in the "up" communication module 3. The B controller 15 refers to the event register 16 to detect whether or not that event code has been stored therein. If not, the controller B causes the event register 16 to store the event code as a new one. In this manner, whenever the subscriber receives a chargeable program, the event code is stored in the event register 16. The event registers 16 of all the terminal units 2 at the subscribers are equal to one another in storage capacity. In each of the event registers, the chargeable program reception data can be stored up to the limit of the storage capacity.

When the event codes have been stored in the event register to its full storage capacity chargeable programs cannot be received any longer.

The chargeable program reception data thus stored in the event register 16 is periodically transmitted to the center 1. That is, when a chargeable program reception data collecting instruction is issued from the center by polling, the contents of the event register 16 at that time are read out by the B controller in the "up" communication module 3 and are modulated by the telephone modem 14. The output of the telephone modem 14 is transmitted as "up" data to the center 1 through the exchange network 5. At the center 1, the "up" data is demodulated by the telephone modem 9, and according to the output of the telephone modem 9, the charging process is carried out by the CPU 7.

In the case where the "up" data communication is performed through telephone lines, the time required for collecting "up" data from each terminal unit is of the order of thirty seconds. As the CATV system increases in scale, the time required for collecting "up" data from all of the terminal units is increased, for instance, to several days. If, during this period, the up communication module 3 is disassembled, and the event register 16 is modified to erase the event codes, then the subscriber will not be charged for the reception of the chargeable programs.

The monetary loss due to such dishonest reception of chargeable programs may be reduced by decreasing the storage capacity of the event register. However, the method is still disadvantageous in that the chance of earning an income is lost as much as the storage capacity of the event register is decreased.

SUMMARY OF THE INVENTION

Accordingly, an object of this invention is to eliminate the above-described difficulties accompanying a conventional two-way CATV system.

The foregoing object and other objects of the invention have been achieved by the provision of a chargeable program receiving system for a two-way CATV system. According to the invention, a central facility is provided with a subscriber file in which audience control data and credit limits which determine chargeable program receiving limits for respective subscribers are stored. A central processing unit transmits the credit limits, in a command format, to the terminal units, and each of the terminal units is provided with an event register for storing a history of receiving chargeable programs. A memory in the terminal unit stores the credit limit transmitted from the central facility. A controller changes a logical range of use of the event register according to the credit limit stored in the memory. As a result, chargeable program receiving limits are provided respectively for subscribers.

The nature, principle and use of the invention will become more apparent from the following detailed description when read in conjunction with the accompanying drawings.

BRIEF DESCRIPTION OF THE DRAWINGS

More specifically, FIG. 1 is a block diagram showing the arrangement of a central facility and the arrangement of a terminal unit in the CATV system;

FIG. 2 is a block diagram showing an "up" communication module provided on the side of the terminal unit;

FIG. 3 is an explanatory diagram showing the format polling command data transmitted to the terminal unit; and FIG. 4 is an explanatory diagram, partly as a block diagram, schematically showing a subscriber file the contents of which are reflected on the terminal units.

More specifically, FIG. 5 is a block diagram showing the arrangement of a central facility and the arrangement of a terminal unit in the conventional two-way CATV system; and FIG. 6 is a block diagram showing the arrangement of an "up" communication module provided on the side of the terminal unit.

DETAILED DESCRIPTION OF THE INVENTION

Figure 5:
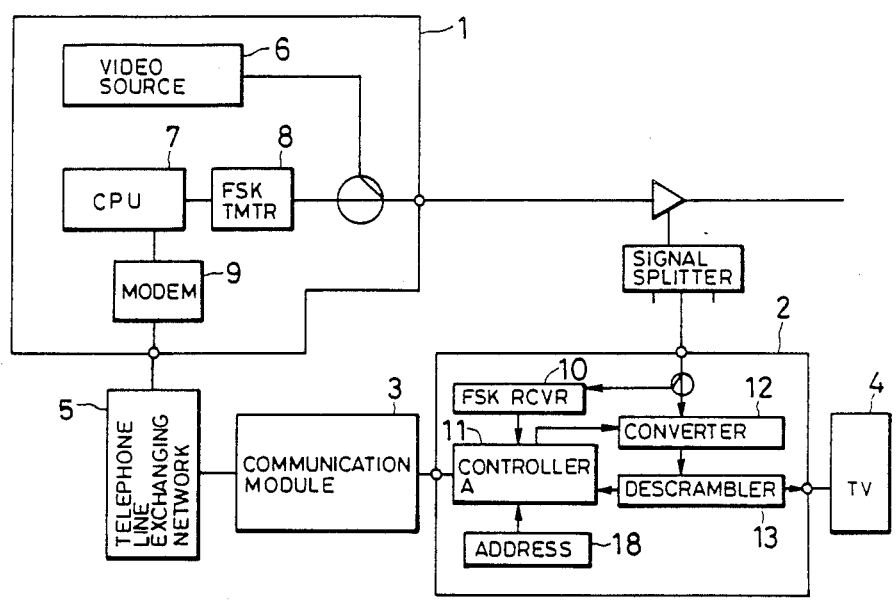
FIG. 5 and 6 show a conventional two-way CATV system.
Figure 6:
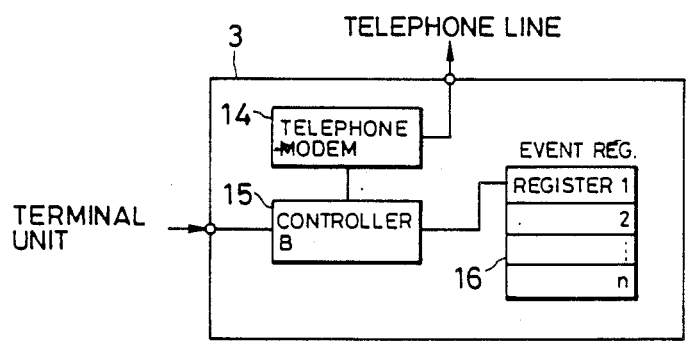

One preferred embodiment of this invention will be described with reference to FIGS. 1 through 4. In FIGS. 1 through 4, parts corresponding functionally to those already described with reference to FIGS. 5 and 6 are therefore designated by corresponding reference numerals, and the preceding description is applicable thereto.

Figure 1:
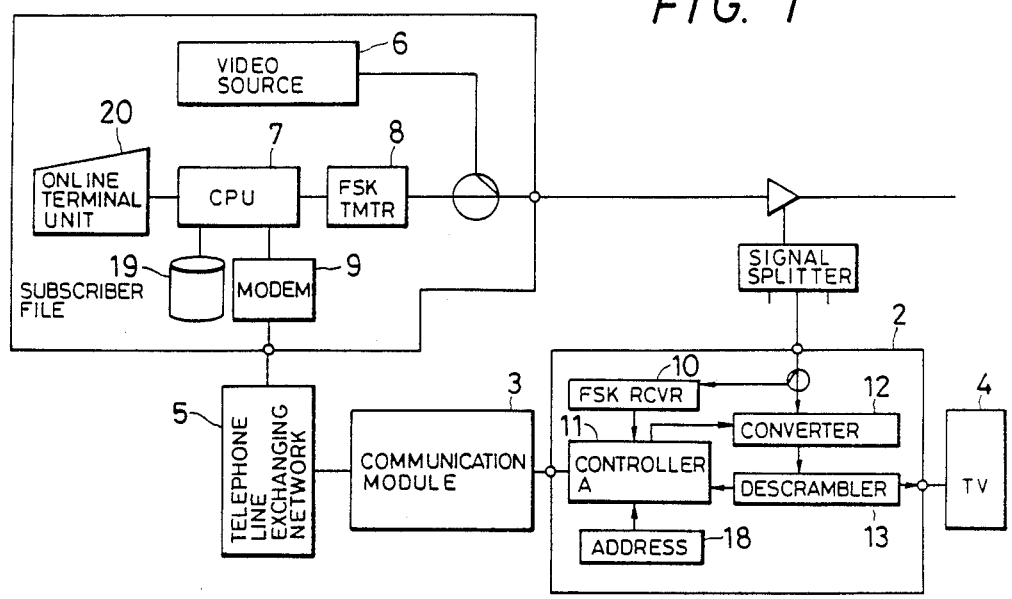
FIGS. 1 through 4 are diagrams for a description of a chargeable program receiving limit setting system in a two-way CATV system according to this invention.
Figure 2:
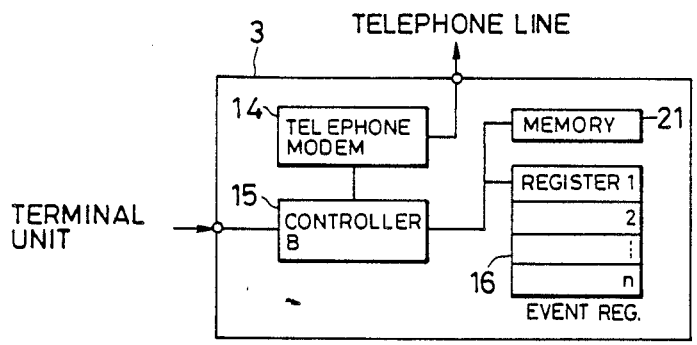

As shown in FIG. 1, at the center 1, a subscriber file 19 holding the addresses of terminal units 2 at subscriber locations and subscriber audience control data is connected to the CPU 7. The audience control data, including the history of payment made by each subscriber and the names of subscribers who have ever made a dishonest reception of chargeable programs, is referred to so that the subscriber who has not satisfactorily paid for the reception of chargeable programs or the subscriber who has ever dishonestly received chargeable programs is limited in reception of chargeable programs. Therefore, according to the audience control data, a credit limit (CL) is provided for each of the subscribers and stored in the subscriber file 19. The CPU 7 polls the terminal units at the subscriber locations through the CATV line with the data of the subscriber file 19 in a command format. The contents of the subscriber file 19 can be added, changed and eliminated by an on-line terminal unit 20 at the center 1 or by periodic batch processing. The changed file contents are reflected on the terminal units 2 and the "up" communication module 3 at the subscribers by the aforementioned polling.

Figure 3:
Figure 4:
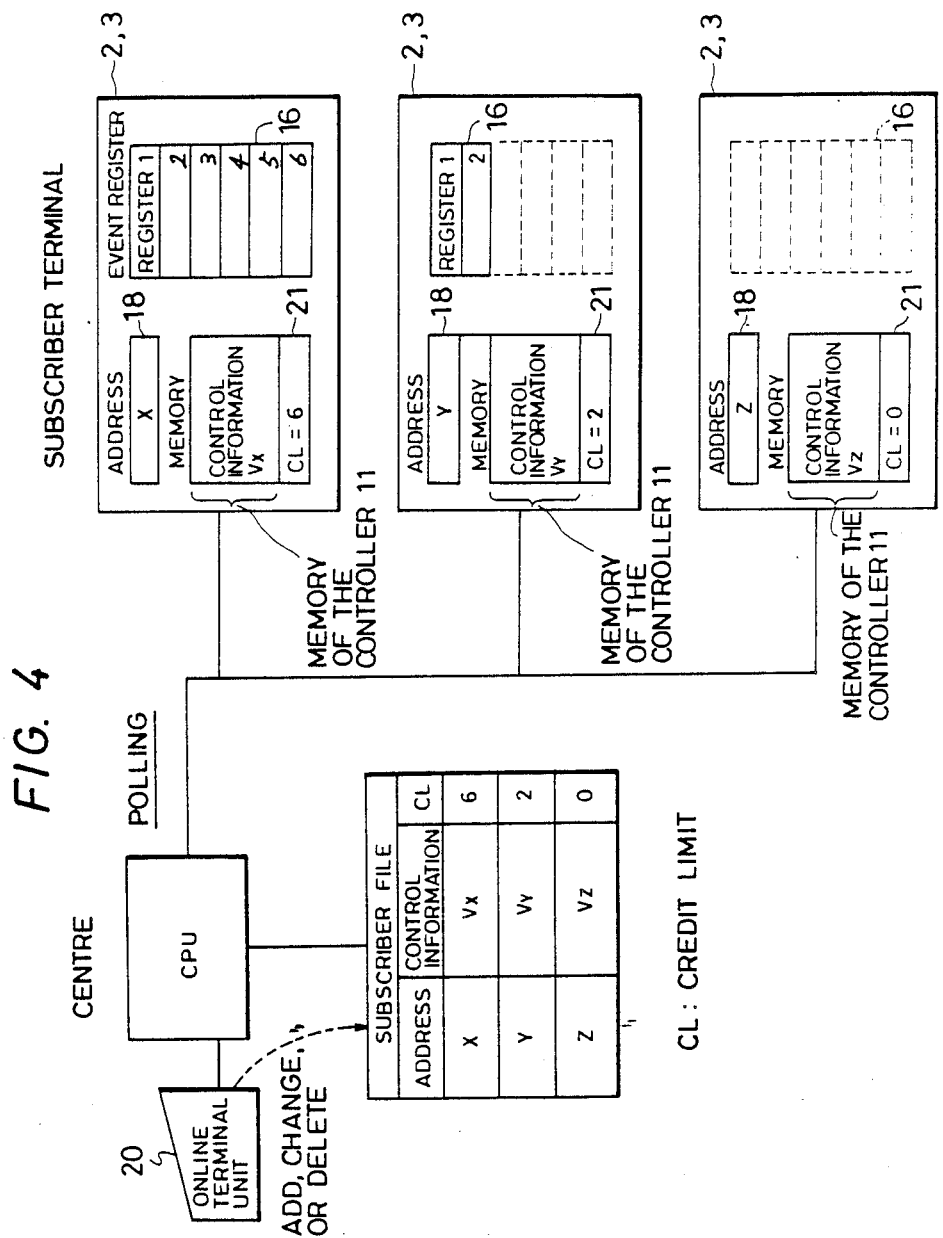

FIG. 3 shows the command format of the polling and FIG. 4 schematically shows the subscriber file which is reflected on the terminal units 2. When, in each of the terminal units 2, a command having its own address is received, the credit limit included in the command is stored in a memory 21 in the "up" communication module 3, and the logical range of use of the event register 16 is determined by the B controller 15. The number of chargeable programs which can be received before polling for charges is increased with the logical range of use thus determined. The credit limit may be increased for a reliable subscriber from whom a high income can be obtained. For a subscriber who has ever dishonestly received chargeable programs, the credit limit may be set to zero so as to inhibit his receiving any chargeable programs.

FIG. 3 shows a command format in the polling. The command includes a start flag, an address, control information, a credit limit and a stop flag. The address indicates a code given to each of the terminal units. The control information is digital data for controlling access to the program signals transmitted from the center 1. Each of the terminals has its own control information. The credit limit designates a number of an event register 16 contained in each of the terminals. In other words, the credit limit shows a receivable limit of the events for the respective subscriber.

The above information is stored in the subscriber file 19 of the center 1 shown in FIG. 4. These information data can be changed or deleted by a key board operation of the on-line terminal unit 20 of the center 1 in consideration of a subscriber's requirement, an honesty of the subscriber, and a policy of the center side and the like.

FIG. 4 shows the CPU 7, the on-line terminal unit 20, and a content of the subscriber file 19 of the center 1, which are reflected on the terminal units 2. FIG. 4 also shows a condition of the terminal units corresponding to the content of the subscriber file. An operation of these components will be described hereinbelow in detail.

The center 1 periodically outputs one time a day or a week, for example, information stored in the subscriber file to the subscriber terminals by polling. If the information includes, for instance, a start flag, address x, control information Vx, credit limit "6" and a stop flag, no subscriber terminal actuates except for that having its own address X. The subscriber terminal having the address X compares the control information Vx transmitted from the center 1 with that stored in the memory 21 of the subscriber terminal. In the case where the compared informations are coincident with each other, nothing is changed. If not, on the other hand, the information in the memory 21 is replaced by the new information transmitted from the center 1. Therefore, new audience control information is stored, as a data, in the memory 21 of the subscriber terminal. Similarly, information of the credit limit "6" transmitted from the center 1 is compared with that (CL=6) stored in the memory 21 of the subscriber terminal. In case that the two credit limits are coincident with each other, nothing is changed. If not, the credit limit stored in the memory 21 is replaced by the new credit limit transmitted from the center 1. In the device of the invention, the event registers 16 contain therein six registers, as shown in FIG. 4. Therefore, if a subscriber terminal contains the credit limit "6" as shown in the top in FIG. 4, it can receive all of six events determined by the event register 16 in the subscriber terminal.

Similarly, information stored in the subscriber terminal having its own address Y or Z can be changed by another polling operation. In FIG. 4, the subscriber, the address of which is Y, has its credit limit "2". Therefore, this terminal receives merely two events. The subscriber the address of which is Z has its credit limit "0" in FIG. 4 and, accordingly, it can receive no event.

As described above, the memory 21 of each of the subscriber terminals can be changed by polling. The subscriber can receive the events from the center 1 according to information newly stored in memory 21 during the polling. Each of the subscriber terminals keeps track of the events and other video information received thereby. Data representing the content of the event register is transmitted to the modem 9 of the center 1 through the communication module 3 and the telephone line exchanging network 5. Based on the event register data received from each of the subscriber terminals, the center 1 can carry out the charging process and, further, measure an audience rating of the program.

If a subscriber is dissatisfied with the content of the memory 21 of his terminal unit, that is, an amount of his credit limit, he can call the center 1 through a telephone line to request an increase in his credit limit. Then, the center 1 changes information data stored in the subscriber's own subscriber file 19 in the center side by a keyboard operation of the on-line terminal unit 20, if the center side agrees to grant his request.

In the CATV system of the invention, similarly as in the conventional CATV system, the subscribers are charged for reception of chargeable programs according to the event registers.

In the above-described embodiment of the invention, the "up" communication module 3 is separate from the terminal unit 2. However, the invention is not limited thereto or thereby. That is, the terminal unit 2 may be so designed as to have an "up" data communicating function.

As is apparent from the above description, the chargeable program receiving limits can be set respectively for the subscribers, in the CATV system of the invention. Therefore, reception of chargeable programs by dishonest subscribers can be prevented and the total income can be increased by sufficiently charging credible and honest subscribers for reception of chargeable programs. Even if a dishonest subscriber made a dishonest reception of chargeable programs again, the monetary loss can be minimized because of the decreased credit limit. Thus, the CATV system of the invention will promise a reasonable income to the system operator.

I claim:

1. In a cable television system having a two-way data communication, a chargeable program receiving limit setting system, comprising:
    a plurality of terminal units assigned to a plurality of respective subscribers; and
    a central facility including a subscriber file for storing respective credit limits which represent predetermined numbers chargeable programs which may be received by respective ones of said subscribers, and a central processing unit for transmitting said respective credit limits in a command format to said terminal units;
    wherein each of said terminal units includes an event register for storing a history of chargeable programs having been received, each said event register including a plurality of locations each for storing an indication of a program having been received, a limit memory for storing a respective one of said respective credit limits transmitted from said central facility, and a controller for changing a logical range of use of the locations of said event register according to said credit limit stored in said limit memory; and
    wherein different chargeable program receiving limits can be provided by said central facility to respective ones of said subscribers.

2. A limit setting system as recited in claim 1, wherein each of said terminal units includes means for transmitting the contents of said event register to said central facility and wherein said controller in said each of said terminal units limits said use of said event register between successive transmissions of said contents of said event register according to said stored credit limit.

3. A limit setting system as recited in claim 2, wherein said command format contains a selectable address for selecting a respective one of said subscribers and wherein each of said terminal units contains an address memory containing a predetermined address and means for storing said credit limit in said limit memory responsive to a comparison of said selectable address with said predetermined address.

4. A limit setting system as recited in claim 1, wherein:
    said subscriber file further stores respective audience control data for controlling access to programs transmitted by said control facilities, said central processing unit transmits said respective audience control data in a command format to said terminal units and said limit memory stores a respective one of said respective audience control data in addition to a respective one of said respective credit limits transmitted from said central facility, and wherein said controller changes a logical range of use of said event register according to said audience control data and said credit limit stored in said limit memory; and
    wherein different audience control data and different chargeable program receiving limits can be provided by said central facility to respective ones of said subscribers.

5. A limit setting system as recited in claim 1, wherein said subscriber file stores audience control data and said central processing unit transmits said audience control data to said terminal units in addition to said credit limits, and wherein each of said terminal units includes means for storing audience control data in addition to one of said credit limits.

* * * * *